(12) United States Patent
Muradyan et al.

(10) Patent No.: US 12,392,328 B2
(45) Date of Patent: Aug. 19, 2025

(54) ELASTIC ENERGY STORAGE DEVICE WHICH IS USED FOR CONVERTING MECHANICAL ENERGY INTO ELECTRICAL ENERGY

(71) Applicants: Levon Muradyan, Yerevan (AM); Zhanna Sedrakyan, Yerevan (AM); Murad Muradyan, Westlake Village, CA (US)

(72) Inventors: Levon Muradyan, Yerevan (AM); Zhanna Sedrakyan, Yerevan (AM); Murad Muradyan, Westlake Village, CA (US)

( * ) Notice: Subject to any disclaimer, the term of this patent is extended or adjusted under 35 U.S.C. 154(b) by 136 days.

(21) Appl. No.: 18/491,330

(22) Filed: Oct. 20, 2023

(65) Prior Publication Data

US 2024/0141873 A1 May 2, 2024

(30) Foreign Application Priority Data

Oct. 26, 2022 (AM) ................. 20220100Y

(51) Int. Cl.
*F03G 1/02* (2006.01)
*F03G 1/06* (2006.01)
*F16H 25/20* (2006.01)

(52) U.S. Cl.
CPC .............. *F03G 1/029* (2021.08); *F03G 1/06* (2013.01); *F16H 25/20* (2013.01); *F05B 2260/422* (2020.08); *F05B 2260/503* (2013.01); *F05B 2260/87* (2020.08)

(58) Field of Classification Search
CPC ... F03G 1/00; F03G 1/02; F03G 1/029; F03G 1/06; F05B 2260/422; F05B 2260/502; F05B 2260/506; F05B 2260/87; F16H 25/20

See application file for complete search history.

(56) References Cited

U.S. PATENT DOCUMENTS

| | | | | |
|---|---|---|---|---|
| 2,493,989 | A * | 1/1950 | Middlestetter | .......... F03G 1/029 185/37 |
| 2004/0007427 | A1 | 1/2004 | Chio | |

* cited by examiner

*Primary Examiner* — Phillip A Johnson
(74) *Attorney, Agent, or Firm* — Keith Lutsch PC

(57) ABSTRACT

A device for the accumulation of elastic energy and converting it into electrical energy, which provides the highest possible efficiency of energy storage and conversion. The device uses a high load capacity and efficiency of the roller screw mechanism and the ability of disc springs to store and release energy with the greatest possible specific elastic deformation. The device is equipped with a brake, which makes it possible to maintain the accumulation of elastic energy for a long time. In the state of energy storage, the motor-generator works as a motor, and to convert the stored elastic energy into electrical energy, it works as a generator.

20 Claims, 5 Drawing Sheets

ELASTIC ENERGY STORAGE DEVICE WHICH IS USED FOR CONVERTING MECHANICAL ENERGY INTO ELECTRICAL ENERGY

TECHNICAL FIELD

This invention is related to a device and a method of accumulating mechanical strain energy for its conversion into electrical energy as an output at any requested moment.

BACKGROUND

The electric power grid operates based on a delicate balance between supply (generation) and demand (consumer use). One way to help balance fluctuations in electricity supply and demand is to store electricity during periods of relatively high production and low demand, then release it back to the electric power grid during periods of lower production or higher demand.

At present, the accumulation of elastic energy and its transformation into electrical energy is carried out mostly with the help of helical springs, which are intended mainly for devices that require energy storage of low power (less than 1 kW).

In all known devices, the accumulation and transformation of elastic energy occurs due to the deformation of helical springs. The specific deformation energy of helical springs is a small value and, therefore, it is obvious that this energy can be of great practical importance only when a very large number of springs are used in the device, which is not justified from a practical point of view.

The present invention is based on the idea of creating such a device for storing elastic energy and converting it into electrical energy, which is devoid of the above disadvantages and provides a possible high energy conversion efficiency. The closest solution to the proposed one is the device described in the patent US 2004/0007427A1, Elastic energy storage device.

SUMMARY

A motor-generator is connected as a motor and rotates the of a roller mechanism. Threaded roller nuts move pressure plates and deform disc springs. The accumulation of deformation energy of the disc spring system is limited by a circuit breaker, which prevents overloading of the disc spring system. The support of the device with its brake is used for long-term storage of the accumulated elastic energy. To convert the accumulated elastic energy into electrical energy, the motor-generator is connected as a generator. During the operation of the generator, the device can also be braked and restarted at any time. When using the device in the power supply system, it is necessary to install a synchronous motor-generator in the device.

A method of indefinite accumulation and production of industrial electricity from both alternative sources and excess energy of electrical networks can be carried out using the device.

According to embodiments of the present invention, a device, which includes at least one roller screw mechanism, the screw of which has a right-hand thread on one side and a left-hand thread on the opposite side, and is installed and movably fixed in a bearing, which is fixed on the baffle of the device housing, on the surface of which there are cylindrical guides fixed on both sides, symmetric with respect to the screw. A disc spring system is located on the cylindrical guides. There are symmetrically installed movable nuts on both sides of the screw, working together with threaded rollers. Pressure plates with a system of holes, aligned with the guide cylinders, are attached symmetrically to the movable nuts, serving to maintain the force interaction between the screw and the disc spring system. To ensure the appropriate speed of rotation of an motor-generator, one end of the screw is connected to the output shaft of a gearbox by a coupling, and the input shaft of the gearbox is connected to the generator-motor by an electromagnetic clutch and a pair of gears. A disconnecting clutch, using circuit breakers, fixed on the body of the device, receives a signal about the deformed state of the disc springs of the system and keeps the device either in the state of accumulation of elastic energy or in the state of braking, ensuring the operation of the motor-generator as a drive motor and a generator for converting the stored elastic energy into electrical energy.

The basic principle of operation of the device is that in order to accumulate the maximum possible amount of elastic energy, a roller-screw mechanism is used, which makes it possible to ensure the accumulation of elastic energy, which is of practical importance for small deformations.

With the help of disc springs capable of accumulating up to several million newton meters of elastic energy, it is possible to ensure the operation of the device for practically important purposes. The selection of the geometric dimensions of the springs makes it possible to ensure reduction in the deformation increment as the deformation of the spring increases. That is, the derivative function expressing the spring's deformation tends to zero when its deformation tends to the maximum allowable value. This makes it possible to use that part of the accumulated elastic energy, the power of which exceeds the power of the installed generator by 5-10%.

Having built a graph of the accumulated energy intensity of the system of disc springs depending on the magnitude of their total deformation, determining the position of the screw handles when the accumulated energy intensity is equal to the installed power of the generator, and, in this position, triggers a first circuit breaker fixed on the body of the device to turn off the generator. A second circuit breaker is mounted on the body of the device in the same direction, so that the power to the motor of the device is turned off when the deformation of the disc spring system becomes equal to the maximum value of the allowable deformation.

The disc spring system of the device can be installed in the device housing in a pre-deformed state, so that its energy is equivalent to the power of the generator of the device. For that purpose, on the inner cylindrical surface of the free ends of the guide cylinders, screws with a small pitch are made, into which the screws are inserted, the diameters of the heads of which are 2-5 mm larger than the outer diameter of the guide roller.

To obtain the required torque on the roller screw mechanism during the operation of the motor and generator, a gearbox with an appropriate gear ratio is used. To ensure the frequency response of the electricity generated by the device, it is necessary to use synchronously, a multi-pole motor-generator. This also allows the device to use a gearbox with a lower gear ratio. The electromagnetic disengaging clutch transfers the rotational motion of the motor to the roller screw mechanism (if the motor is on) and vice versa when the generator is on. The brake of the device is activated in any other position.

To ensure the disc springs even movement when they are deformed into guide cylinders, cylindrical washers are installed between the springs. The inner diameter of the washers is equal to the outer diameter of the guide cylinder (the manufacturing accuracy corresponds to a sliding fit). The outer diameter is equal to the outer diameter of the spring. The thickness of the washers is equal to the length of the spring. Intermediate washers can be installed after every tenth spring.

To increase the power of the device, it is convenient to use more than one roller screw mechanism installed in parallel and working synchronously. Then, the screws of the mechanisms are connected to the gearbox through a chain drive. To accumulate high-capacity tensile energy and convert it into electrical energy, it is possible to use a set of the proposed devices, when the screws of their roller mechanisms are connected in series with each other by couplings, and the last device is connected to a gearbox, which, in turn, is connected to the circuit breaker clutch and motor-generator.

A set of devices does not require much space to deploy. Calculations show a unit consisting of 40 devices equipped with 30 disc springs can generate 152 kW of electrical energy for 3 hours and will occupy an area of 6×6 m$^2$ (FIG. 4). A group of 170 devices with 110 disc springs can provide 10,000 kW of electricity for 12 hours, serving up to five electric energy consumers, within the relatively small area of 60×12 m$^2$ (FIG. 5).

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
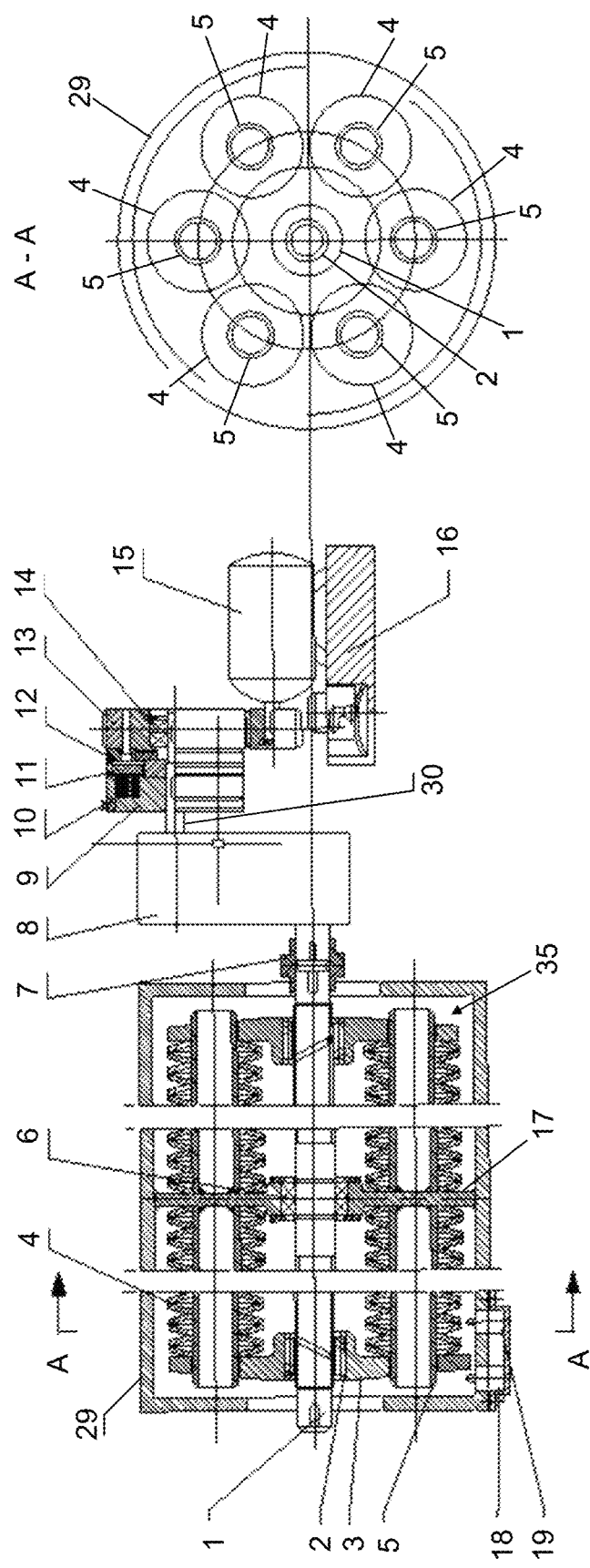
FIG. 1 shows a device with a roller screw mechanism, a reducer, a changeover valve and a motor-generator according to the present invention.

An embodiment of a device according to the present invention includes a screw (1) of a roller screw mechanism (35), the screw (1) having left-hand and right-hand threaded portions which cooperate with two nuts (2) are installed in pressure plates (3) which are fixed perpendicular to the screw axis, and the middle part of the screw (1) is symmetrically installed in bearings (6), which are fixed in the center of the middle wall (17) of the device. On a middle wall (17) of the device, symmetrically to the screw (1) of the roller screw mechanism, guide cylinders (5) are fixed, on which a system of disc springs (4) is installed. The pressure plates (3) serve to maintain the force interaction between the screw (1) and the disc spring system. An outer housing (29) provides a closed environment for the disc spring system. One end of the screw (1) is connected to a gearbox (8) by means of a coupling (7) to give a motor-generator (15) an appropriate rotation speed. A gearbox input shaft (30) is connected to a projecting shaft of the motor-generator (15) through an electromagnetic clutch (9-12, 14) having first and second projecting shafts, the electromagnetic clutch (9-12, 14) connecting or disconnecting the first and second projecting shafts, and a pair of gears (13). With the help of automatic switches (18, 19), switch (18) indicating the desired minimal energy state and switch (19) indicating the desired maximum deflection and energy state, fixed on the outer housing (29) of the device, the commutation clutch receives a signal about the deformed state of the disc spring system. A device support with brake (16) is used to maintain the stored elastic energy for a long time without energy consumption.

Figure 2:
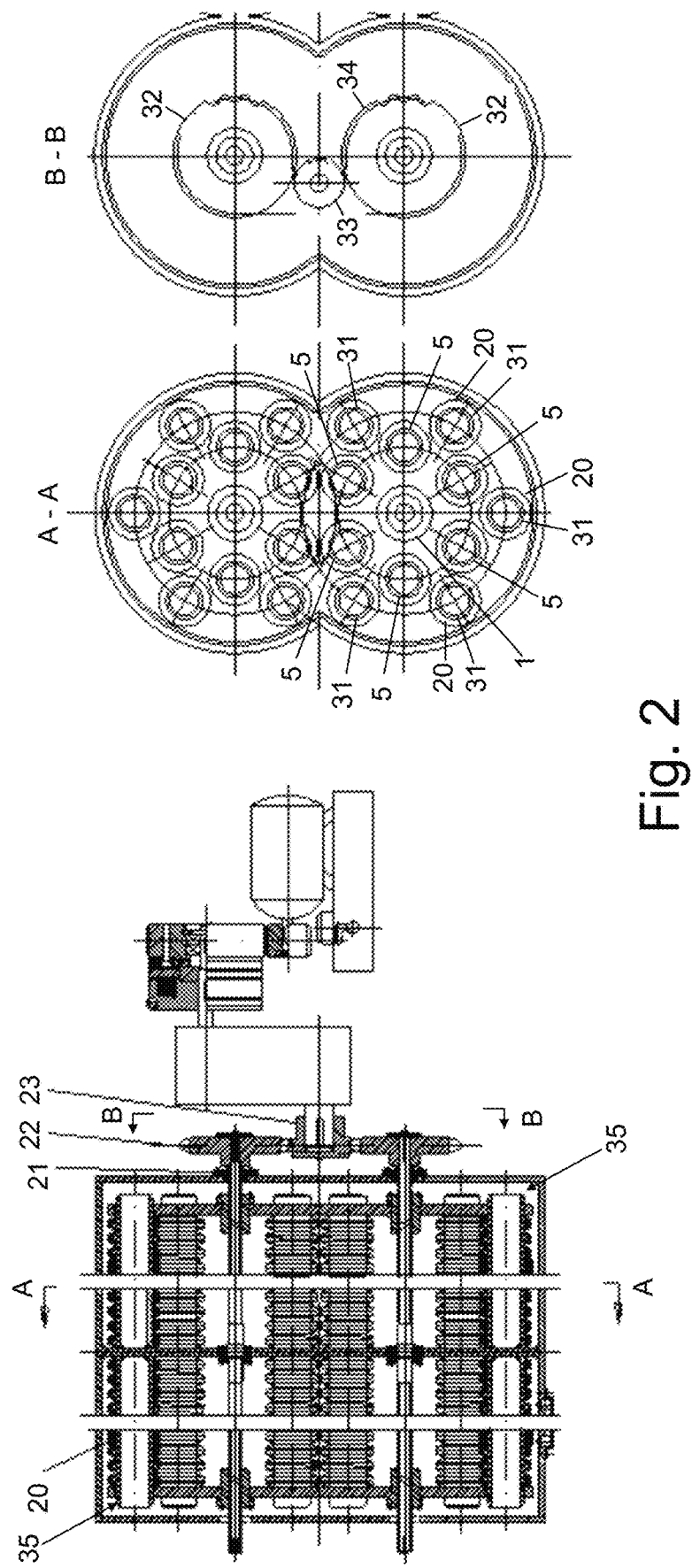
FIG. 2 shows the device of FIG. 1 when it is equipped with two roller screw mechanisms and connected to a gearbox by means of a chain drive.

FIG. 2 shows an embodiment of a device according to the present invention with two roller screw mechanisms (35). The use of the cylindrical washers (20) around additional guide cylinders (31) is intended to improve the conditions for moving the disc spring system along the guide cylinders (5). A chain drive (22) formed of gears (32) connected to the ends of the screws (1) of each roller screw mechanism (35) and a gear (33) connected to the gearbox (8), with a chain 34 connecting the gears 32 and 33, provides connection of the roller screw mechanisms (35) with the gearbox (8). In this case, the ends of the screws (1) of the roller screw mechanism (35) from the side of the chain transmission are installed in plain bearings (21), which are fixed in the outer housing (29). Single pressure plates (3) can be used across each roller screw mechanism (35) or separate pressure plates (3) can used for each roller screw mechanism (35).

Figure 3:
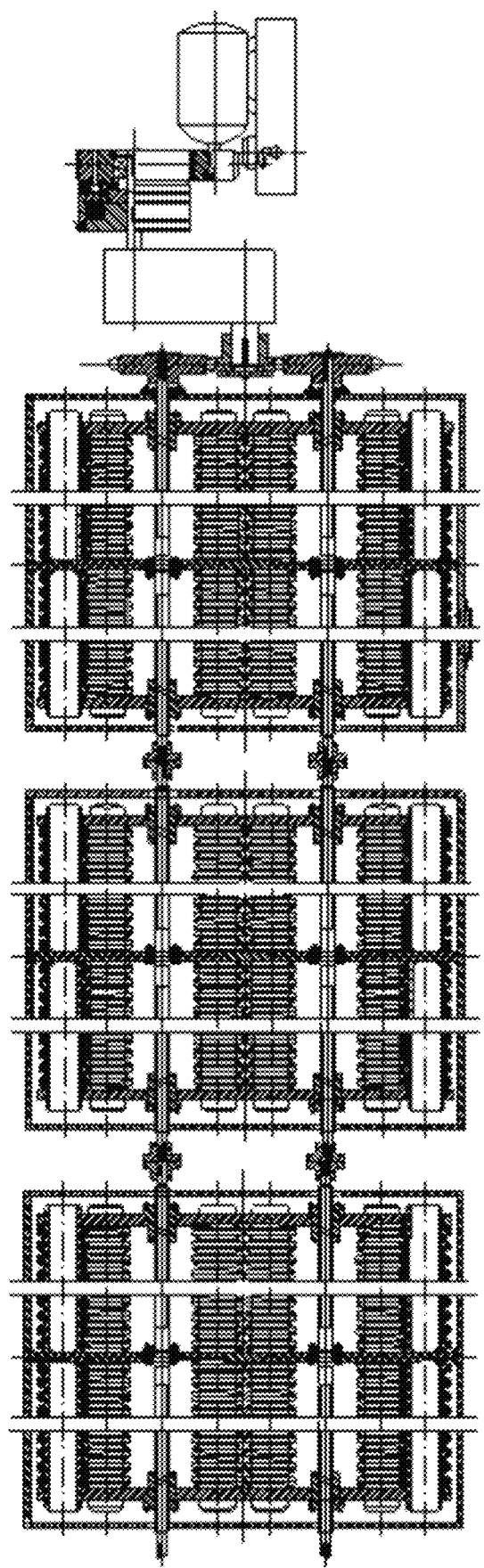
FIG. 3 shows a set of the devices where the screws of the roller screw mechanisms are connected in series to each other by couplings, and the last device is connected to a gearbox, and in series, to the circuit breaker clutch and the motor-generator.

FIG. 3 illustrates multiple devices connected in series to provide greater energy storage and delivery capabilities.

Figure 4:
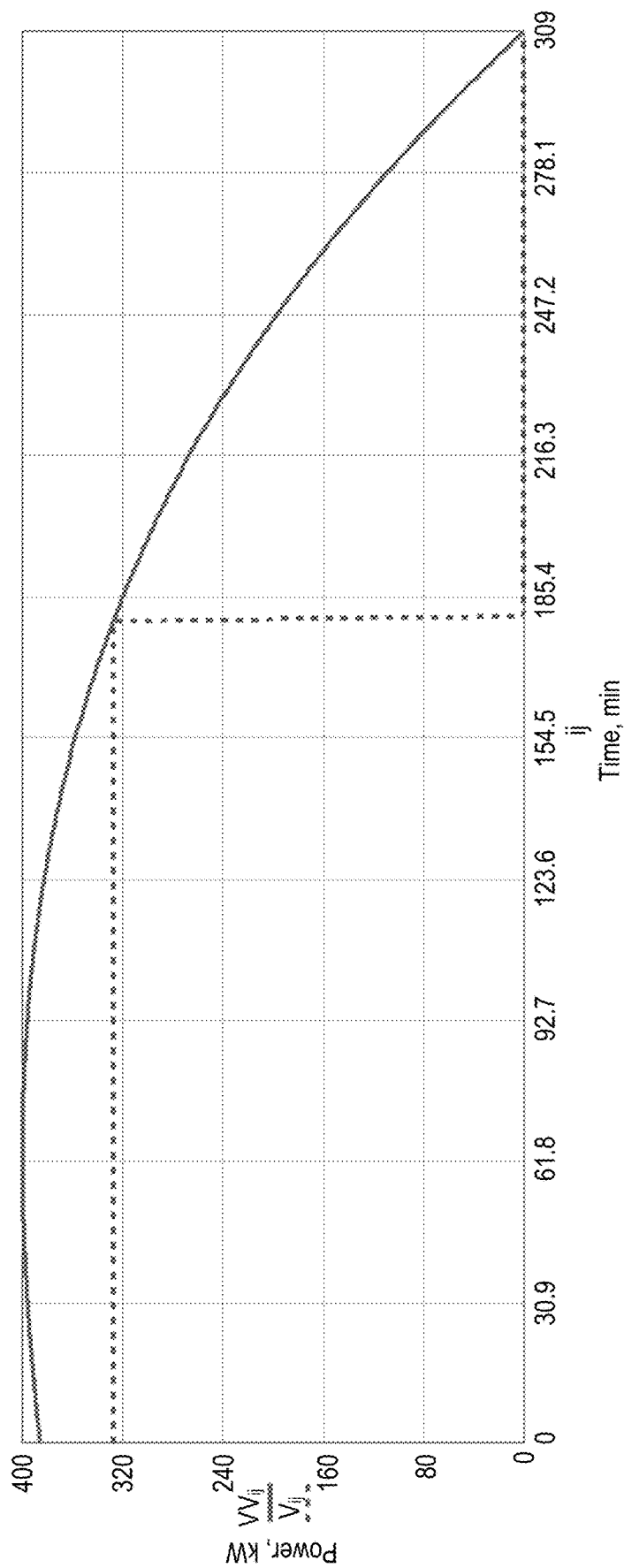
FIG. 4 represents a graph of the accumulated elastic energy in one cycle.

FIG. 4 represents a graph of the accumulated elastic energy in one cycle for a first design described above.

Figure 5:
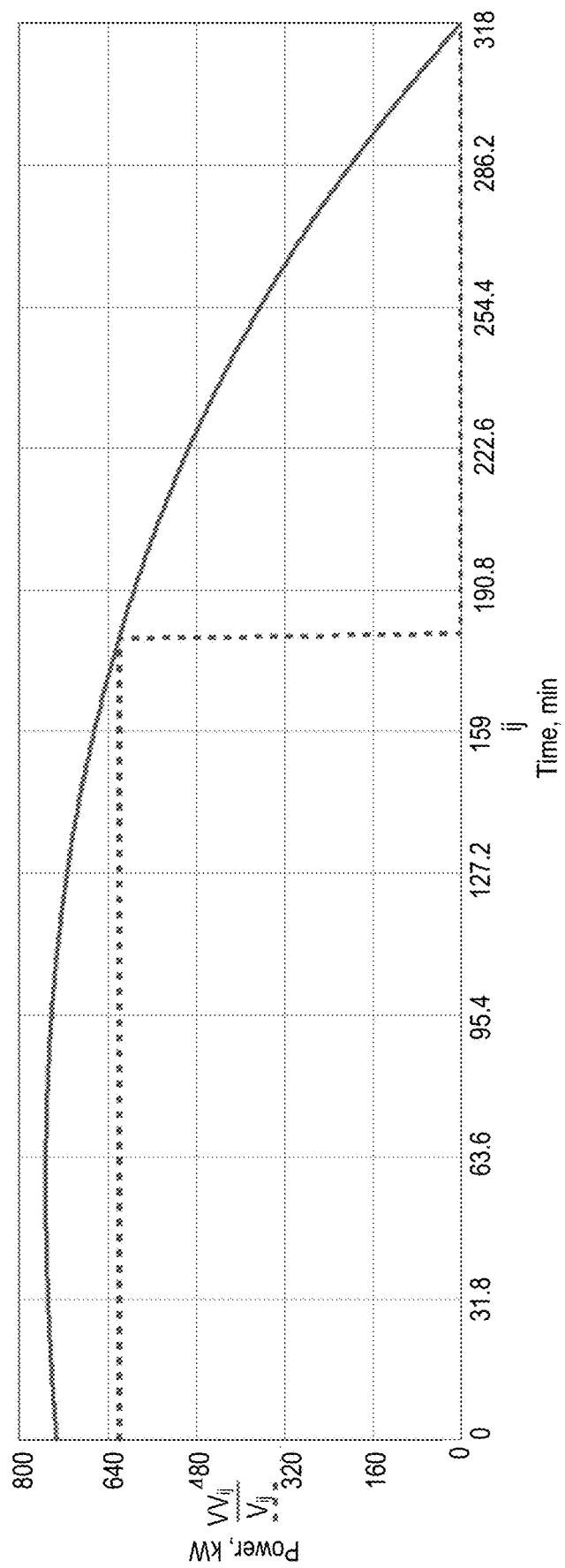
FIG. 5 represents a graph of the converted energy in one cycle.

FIG. 5 represents a graph of the converted energy in one cycle for a second design described above. $VV_{ij}$ is the power of accumulated elastic energy in kW. $V_{ij}$ is the power of converted electrical energy in kW. Ij is the deformation time of a set of disc springs in minutes.

While the use of a screw (1) with alternate threads at opposed ends has been described, in another embodiment only one set of threads is used, so that the middle wall (17) is not necessary. While the use of a gearbox (8) and electromagnetic clutch (9-12, 14) has been described, in other embodiments different mechanisms are used to couple the device to the motor-generator (15). Use of a continuously variable transmission (CVT) would simplify speed matching of the motor-generator (15) with the electrical grid. While switches (18, 19) have been described as controlling the limits of energy storage and delivery, other sensors to detect the location of the pressure plates (3) can be used.

While uniformly sized disc springs have been described and illustrated, different sizes of disc springs can be used on different guide cylinders. With the different sizes of disc springs, different numbers of disc springs can be used on each guide cylinder.

While the illustrated guide cylinders contact and project from the middle plate, the guide cylinders can also pass through the middle plate, either being affixed to the middle plate or being unconnected to the middle plate.

While the guide cylinders are illustrated as being equally spaced around the roller screws, both radially and circumferentially, the spacings of the guide cylinders do not need to be equal, particularly if different sized disc springs are used.

The various examples described are provided by way of illustration and should not be construed to limit the scope of the disclosure. Various modifications and changes can be made to the principles and examples described herein without departing from the scope of the disclosure and without departing from the claims which follow.

The invention claimed is:

1. An energy storage device, comprising:
   an outer housing having an enclosed volume and first and second ends and an opening in each end;
   a roller screw having a right-hand thread portion and a left-hand thread portion, the roller screw located inside the outer housing and having first and second ends projecting through first and second end openings of the outer housing;
   a middle wall located inside the outer housing, centered between the first and second ends and having an opening through which the roller screw passes;
   a plurality of guide cylinders located inside the outer housing and spaced around and aligned with the roller screw, a first end of each guide cylinder contacting the middle wall, a first portion of the plurality of guide cylinders extending from the middle wall towards the first end of the outer housing and a second portion of the plurality of guide cylinders extending from the middle wall towards the second end of the outer housing;
   first and second pressure plates located inside the outer housing and respectively at the first and second ends of the outer housing, each pressure plate having an opening through which the roller screw passes and having openings through which the second end of a first or second portion of the guide cylinders pass;
   first and second nuts fixedly located in the openings of the first and second pressure plate the first nut having a right-handed thread to receive the right-hand thread portion of the roller screw and the second nut having a left-handed thread to receive the left-hand thread portion of the roller screw; and
   a plurality of disc springs mounted on each guide cylinder, a series of the disc springs reaching from the middle wall to a respective first or second pressure plate, each disc spring having an opening through which a guide cylinder passes.

2. The energy storage device of claim 1, further comprising:
   a gearbox having first and second projecting shafts, a first shaft coupled to an end of the roller screw projecting from the outer housing;
   a clutch having first and second projecting shafts, a first projecting shaft coupled to the second gearbox shaft, the clutch connecting or disconnecting the first and second projecting shafts; and
   a motor-generator having a projecting shaft, the a coupled to the second.

3. The energy storage device of claim 2, further comprising:
   a brake coupled to the motor-generator shaft.

4. The energy storage device of claim 1, further comprising:
   first and second switches mounted to the outer housing, the first and second switches interacting with the first or second pressure plate to determine first and second locations of the first or second pressure plate, the first location defining a desired maximum energy state of the energy storage device and the second location defining a desired minimum energy state of the energy storage device.

5. The energy storage device of claim 1, further comprising:
   a plurality of washers, each washer located between a pair of the disc springs.

6. The energy storage device of claim 1, further comprising:
   a plurality of additional guide cylinders located inside the outer housing and spaced around and aligned with the roller screw, a first end of each additional guide cylinder contacting the middle wall, a first portion of the plurality of additional guide cylinders extending from the middle wall towards the first end of the outer housing and a second portion of the plurality of additional guide cylinders extending from the middle wall towards the second end of the outer housing; and
   a plurality of washers mounted on each additional guide cylinder,
   wherein each pressure plate has openings through which the second end of a first or second portion of the additional guide cylinders pass.

7. An energy storage system, comprising:
   an outer housing having an enclosed volume and first and second ends and a plurality of openings in each end;
   a middle wall located inside the outer housing, centered between the first and second ends and having a plurality of openings;
   a plurality of roller-screw mechanisms, each roller-screw mechanism including:
      a roller screw having a right-hand thread portion and a left-hand thread portion, the roller screw located inside the outer housing and having first and second ends projecting through outer housing first and second end openings;
      a plurality of guide cylinders located inside the outer housing and spaced around and aligned with the roller screw, a first end of each guide cylinder contacting the middle wall, a first portion of the plurality of guide cylinders extending from the middle wall towards the first end of the outer housing and a second portion of the plurality of guide cylinders extending from the middle wall towards the second end of the outer housing;
      first and second pressure plates located inside the outer housing and respectively at the first and second ends of the outer housing, each pressure plate having an opening through which the roller screw passes and having openings through which the second end of a first or second portion of the guide cylinders pass;
      first and second nuts fixedly located in the first and second pressure plate openings, the first nut having a right-handed thread to receive the right-hand thread portion of the roller screw and the second nut having a left-handed thread to receive the left-hand thread portion of the roller screw; and
      a plurality of disc springs mounted on each guide cylinder, a series of the disc springs reaching from the middle wall to a respective first or second pressure plate, each disc spring having an opening through which a guide cylinder passes; and
   a drive coupled to an end of the roller screw of each roller-screw mechanism and having an output.

8. The energy storage system of claim 7, further comprising:

a gearbox having first and second projecting shafts, a first shaft coupled to the drive output;

a clutch having first and second projecting shafts, a first projecting shaft coupled to the second gearbox shaft, the clutch connecting or disconnecting the first and second projecting shafts; and a motor-generator having a projecting shaft, the motor-generator projecting shaft coupled to the second clutch projecting shaft.

9. The energy storage system of claim 8, further comprising:

a brake coupled to the motor-generator shaft.

10. The energy storage system of claim 7, further comprising:

first and second switches mounted to the outer housing, the first and second switches interacting with the first or second pressure plate of the roller-screw mechanism to determine first and second locations of the first or second pressure plate, the first location defining a desired maximum energy state of the energy storage system and the second location defining a desired minimum energy state of the energy storage system.

11. The energy storage system of claim 7, each roller-screw mechanism further including:

a plurality of washers, each washer located between a pair of disc springs.

12. The energy storage system of claim 7, each roller-screw mechanism further including:

a plurality of additional guide cylinders located inside the outer housing and spaced around and aligned with the roller screw, a first end of each additional guide cylinder contacting the middle wall, a first portion of the plurality of additional guide cylinders extending from the middle wall towards the first end of the outer housing and a second portion of the plurality of additional guide cylinders extending from the middle wall towards the second end of the outer housing; and a plurality of washers mounted on each additional guide cylinder, wherein each pressure plate of the roller-screw mechanism has openings through which the second end of a first or second portion of the additional guide cylinders pass.

13. The energy storage system of claim 7, wherein the drive includes:

a plurality of gears, each gear coupled to an end of roller screw;

an output gear providing the drive output; and a chain linking each of the plurality of gears and the output gear.

14. The energy storage system of claim 7, where the first pressure plates of each roller-screw mechanism are combined into a single first pressure plate and the second pressure plates of each roller-screw mechanism are combined into a single second pressure plate.

15. An energy storage system, comprising:

a plurality of energy storage devices, each energy storage device including:

an outer housing having an enclosed volume and first and second ends and an opening in each end;

a roller screw having a right-hand thread portion and a left-hand thread portion, the roller screw located inside the outer housing and having first and second ends projecting through the outer housing first and second end openings;

a middle wall located inside the outer housing, centered between the first and second ends and having an opening through which the roller screw passes;

a plurality of guide cylinders located inside the outer housing and spaced around and aligned with the roller screw, a first end of each guide cylinder contacting the middle wall, a first portion of the plurality of guide cylinders extending from the middle wall towards the first end of the outer housing and a second portion of the plurality of guide cylinders extending from the middle wall towards the second end of the outer housing;

first and second pressure plates located inside the outer housing and respectively at the first and second ends of the outer housing, each pressure plate having an opening through which the roller screw passes and having openings through which the second end of a first or second portion of the guide cylinders pass;

first and second nuts fixedly located in the first and second pressure plate openings, the first nut having a right-handed thread to receive the right-hand thread portion of the roller screw and the second nut having a left-handed thread to receive the left-hand thread portion of the roller screw; and a plurality of disc springs mounted on each guide cylinder, a series of the disc springs reaching from the middle wall to a respective first or second pressure plate, each disc spring having an opening through which a guide cylinder passes, wherein the plurality of energy storage devices are mounted in series, each intermediate energy storage device having a first roller screw end coupled to the second roller screw end of the preceding energy storage device and the second roller screw end coupled to the first roller screw end of the following energy storage device.

16. The energy storage system of claim 15, further comprising:

a gearbox having first and second projecting shafts, the first gearbox shaft coupled to the first end of the roller screw projecting from the outer housing of the first energy storage device;

a clutch having first and second projecting shafts, the first projecting shaft coupled to the second gearbox shaft, the clutch connecting or disconnecting the first and second projecting shafts; and a motor-generator having a projecting shaft, the motor-generator projecting shaft coupled to the second clutch projecting shaft.

17. The energy storage system of claim 16, further comprising:

a brake coupled to the motor-generator shaft.

18. The energy storage system of claim 15, each energy storage device further including:

first and second switches mounted to the outer housing, the first and second switches interacting with the first or second pressure plate to determine first and second locations of the first or second pressure plate, the first location defining a desired maximum energy state of the energy storage device and the second location defining a desired minimum energy state of the energy storage device.

19. The energy storage system of claim 15, each energy storage device further including:

a plurality of washers, each washer located between a pair of the disc springs.

20. The energy storage system of claim 15, each energy storage device further including:
- a plurality of additional guide cylinders located inside the outer housing and spaced around and aligned with the roller screw, a first end of each additional guide cylinder contacting the middle wall, a first portion of the plurality of additional guide cylinders extending from the middle wall towards the first end of the outer housing and a second portion of the plurality of additional guide cylinders extending from the middle wall towards the second end of the outer housing; and
- a plurality of washers mounted on each additional guide cylinder,
- wherein each pressure plate has openings through which the second end of a first or second portion of the additional guide cylinders pass.

* * * * *